United States Patent
Huang et al.

(10) Patent No.: US 11,853,882 B2
(45) Date of Patent: Dec. 26, 2023

(54) METHODS, APPARATUS, AND STORAGE MEDIUM FOR CLASSIFYING GRAPH NODES

(71) Applicant: TENCENT TECHNOLOGY (SHENZHEN) COMPANY LIMITED, Shenzhen (CN)

(72) Inventors: Wenbing Huang, Shenzhen (CN); Yu Rong, Shenzhen (CN); Junzhou Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 522 days.

(21) Appl. No.: 17/153,014

(22) Filed: Jan. 20, 2021

(65) Prior Publication Data

US 2021/0142108 A1 May 13, 2021

Related U.S. Application Data

(63) Continuation of application No. PCT/CN2019/117173, filed on Nov. 11, 2019.

(30) Foreign Application Priority Data

Nov. 15, 2018 (CN) .......................... 201811361409.0

(51) Int. Cl.
G06F 18/213 (2023.01)
G06N 3/08 (2023.01)
(Continued)

(52) U.S. Cl.
CPC ............. *G06N 3/08* (2013.01); *G06F 18/213* (2023.01); *G06F 18/214* (2023.01); *G06F 18/24147* (2023.01); *G06N 7/01* (2023.01)

(58) Field of Classification Search
None
See application file for complete search history.

(56) References Cited

U.S. PATENT DOCUMENTS 11,461,581 B2 * 10/2022 Luo .................. G06N 3/084
2013/0325862 A1 12/2013 Black
(Continued)

FOREIGN PATENT DOCUMENTS

CN 106503319 A 3/2017
CN 106776729 A 5/2017
(Continued)

OTHER PUBLICATIONS

Extended European Search Report regarding EP19883716 dated Nov. 2, 2021.
(Continued)

*Primary Examiner* — Tsung Yin Tsai
(74) *Attorney, Agent, or Firm* — Crowell & Moring LLP

(57) ABSTRACT

The present disclosure describes methods, apparatus, and storage medium for node classification and training a node classification model. The method includes obtaining a target node subset and a neighbor node subset corresponding to the target node subset from a sample node set labeled with a target node class, a neighbor node in the neighbor node subset being associated with a target node in the target node subset; extracting a feature subset of the target node subset based on the neighbor node subset by using a node classification model, the feature subset comprising a feature vector of the target node; performing class prediction for the target node subset according to the feature subset, to obtain a predicted class probability subset; and training the node classification model with a target model parameter according to the predicted class probability subset and a target node class subset of the target node subset.

17 Claims, 10 Drawing Sheets

(51) Int. Cl.
*G06F 18/214* (2023.01)
*G06F 18/2413* (2023.01)
*G06N 7/01* (2023.01)

(56) References Cited

U.S. PATENT DOCUMENTS

| | | | |
|---|---|---|---|
| 2016/0210348 A1 | 7/2016 | Shivashankar et al. | |
| 2018/0232883 A1 | 8/2018 | Sethi et al. | |
| 2019/0286658 A1* | 9/2019 | Leskovec | G06N 3/04 |
| 2021/0201107 A1* | 7/2021 | Laszlo | G06V 10/763 |
| 2021/0201158 A1* | 7/2021 | Laszlo | G06N 3/044 |

FOREIGN PATENT DOCUMENTS

| | | | | |
|---|---|---|---|---|
| CN | 106997474 A | | 8/2017 | |
| CN | 108319953 A | * | 7/2018 | G06K 9/00228 |
| CN | 109460793 A | | 3/2019 | |

OTHER PUBLICATIONS

Scarselli et al., Research Online, "University of Wollongong The graph neural network model", IEEE Transactions on Neural Networks, Jan. 31, 2009, Australia, pp. 61-80.

Japanese Office Action and English translation regarding JP 2021-505770 dated Apr. 12, 2022, 41 pages.

John Boaz Lee, et al., "Higher-order Graph Convolutional Networks," arXiv: 1809.07697v1, [online], arXiv (Cornell University), Sep. 12, 2018, version v1, pp. 1-9.

Masahiro Araki, "Introduction to Machine Learning with Free Software," with concise summary translation, 2nd Edition, Morikita Publishing Co., Ltd., Apr. 20, 2018, pp. 147-148.

Written by Kazuya Fujita (1 outside), supervised by Forward Network Co., Ltd., "Implementation Deep Learning," with concise summary translation, 1st Edition, Ohmsha Co., Ltd., Nov. 30, 2016, 1st pp. 48-56.

Edited by Tatsuya Kawahara, "Voice Recognition System", with concise summar translation, Revised 2nd Edition, Ohmsha Co., Ltd., 2, Sep. 15, 2016, pp. 63-64.

Chinese Office Action with English concise explanation of relevance regarding 201811361409.0 dated Jan. 18, 2023, 12 pages.

John Boaz Lee et al., "Higher-order Graph Convolutional Networks," dated Sep. 12, 2018, 9 pages. Retrieved from the internet: http://arxiv.org/abs/1809.07697.

Franco Scarselli et al., "The Graph Neural Network Model," IEEE Transactions on Neural Networks, vol. 20, No. 1, dated Jan. 31, 2009, pp. 61-80.

International Search Report and concise translation and Written Opinion regarding PCT/CN2019/117173 dated Feb. 18, 2020, 10 pages.

Chinese Office Action with English concise explanation of relevance regarding 201811361409.0 dated Sep. 13, 2022, 5 pages.

European Office Action regarding 19 883 716.3 dated Aug. 4, 2023, 5 pages.

* cited by examiner

METHODS, APPARATUS, AND STORAGE MEDIUM FOR CLASSIFYING GRAPH NODES

RELATED APPLICATION

This application is a continuation application of PCT Patent Application No. PCT/CN2019/117173, filed on Nov. 11, 2019, which claims priority to Chinese Patent Application No. 201811361409.0, filed on Nov. 15, 2018, both of which are incorporated herein by reference in their entireties.

FIELD OF THE TECHNOLOGY

This application relates to the field of Internet technologies, and in particular, to a node classification method, a model training method and apparatus, a device, and a storage medium.

BACKGROUND OF THE DISCLOSURE

With the development of machine learning technologies, image classification tasks have made remarkable progress, and related technologies have been applied to various scenarios such as autonomous driving, security surveillance, and gaming. Similar to pictures, maps are also common data, including, for example, social networks, knowledge maps, and molecular structures of drugs.

In the related art, for large-scale graphs, it is necessary to set up dedicated iterative calculations for the integration of information of graph nodes. FIG. 1 is a schematic diagram of a graph convolutional network (GCN) classification model for graph node classification in the related art. As shown in the figure, v represents a node, and a represents an edge connecting two nodes. By calculating a feature vector of each node of an input layer, information of the entire graph can be updated to obtain first-layer information. A node class is predicted for each node in the first-layer information by using a softmax function.

A large-scale graph generally has tens of millions or even hundreds of millions of nodes, and billions of edges or more. However, to update feature information of each node, the GCN needs to traverse every node in one calculation of the feature information, resulting in excessively high computational overheads and excessively high consumption of computing resources.

The present disclosure describes various embodiments for node classification and training a node classification model, addressing at least one of the problems/issues discussed above. The present disclosure relates to the field of Internet technologies, and improve performance of the Internet technologies.

SUMMARY

Embodiments of this application provide a node classification method, a model training method and apparatus, a device, and a storage medium, which can resolve the problem that a GCN needs to traverse every node in one calculation of the feature information, resulting in excessively high computational overheads and excessively high consumption of computing resources.

The present disclosure describes a method for training a node classification model. The method includes obtaining, by a device, a target node subset and a neighbor node subset corresponding to the target node subset from a sample node set labeled with a target node class, a neighbor node in the neighbor node subset being associated with a target node in the target node subset. The device includes a memory storing instructions and a processor in communication with the memory. The method also includes extracting, by the device, a feature subset of the target node subset based on the neighbor node subset by using a node classification model, the feature subset comprising a feature vector of the target node; performing, by the device, class prediction for the target node subset according to the feature subset, to obtain a predicted class probability subset; and training, by the device, the node classification model with a target model parameter according to the predicted class probability subset and a target node class subset of the target node subset.

The present disclosure describes an apparatus for training a node classification model. The apparatus includes a memory storing instructions; and a processor in communication with the memory. When the processor executes the instructions, the processor is configured to cause the apparatus to: obtain a target node subset and a neighbor node subset corresponding to the target node subset from a sample node set labeled with a target node class, a neighbor node in the neighbor node subset being associated with a target node in the target node subset, extract a feature subset of the target node subset based on the neighbor node subset by using a node classification model, the feature subset comprising a feature vector of the target node, perform class prediction for the target node subset according to the feature subset, to obtain a predicted class probability subset, and train the node classification model with a target model parameter according to the predicted class probability subset and a target node class subset of the target node subset.

The present disclosure describes a non-transitory computer-readable storage medium, storing computer readable instructions. The computer readable instructions, when executed by a processor, are configured to cause the processor to perform: obtaining a target node subset and a neighbor node subset corresponding to the target node subset from a sample node set labeled with a target node class, a neighbor node in the neighbor node subset being associated with a target node in the target node subset; extracting a feature subset of the target node subset based on the neighbor node subset by using a node classification model, the feature subset comprising a feature vector of the target node; performing class prediction for the target node subset according to the feature subset, to obtain a predicted class probability subset; and training the node classification model with a target model parameter according to the predicted class probability subset and a target node class subset of the target node subset.

According to an aspect, a node classification method is provided and is applicable to a computer device. The method includes:
  obtaining one or more to-be-classified nodes in a target node set, the one or more to-be-classified nodes including at least one node in the target node set, and a quantity of the one or more to-be-classified nodes being less than a quantity of nodes in the target node set;
  obtaining a neighbor node set of the to-be-classified node from the target node set, the neighbor node set including at least one neighbor node, an association relationship existing between the neighbor node and the to-be-classified node;
  extracting target feature information of the to-be-classified node according to the neighbor node set by using a node classification model; and determining a classification result of the to-be-classified node according to the target feature information, the node classification model being a model obtained by training at least one sample node subset, the sample node subset being a subset of a sample node set, a node in the sample node set being labeled with a node class.

According to another aspect, a model training method is provided and is applicable to a computer device. The method includes:

obtaining a target node subset and a neighbor node subset corresponding to the target node subset from a sample node set labeled with a target node class, an association relationship existing between a neighbor node in the neighbor node subset and a target node in the target node subset;

extracting a node feature subset of the target node subset based on the neighbor node subset by using a node classification model, the node feature subset including a node feature vector of the target node;

performing class prediction for the target node according to the node feature subset, to obtain a predicted class probability subset; and training a target model parameter of the node classification model according to the predicted class probability subset and the target node class of the target node.

According to another aspect, a node classification apparatus is provided and is applicable to a computer device. The apparatus includes:

an obtaining module, configured to obtain one or more to-be-classified nodes in a target node set;

the obtaining module, further configured to obtain a neighbor node set of the to-be-classified node from the target node set, the neighbor node set including at least one neighbor node, an association relationship existing between the neighbor node and the to-be-classified node;

an extraction module, configured to extract target feature information of the to-be-classified node according to the neighbor node set by using a node classification model; and a determining module, configured to determine a classification result of the to-be-classified node according to the target feature information, the node classification model being a model obtained by training at least one sample node subset, the sample node subset being a subset of a sample node set, a node in the sample node set being labeled with a node class.

According to another aspect, a model training apparatus is provided and is applicable to a computer device. The apparatus includes:

an obtaining module, configured to obtain a target node subset and a neighbor node subset corresponding to the target node subset from a sample node set labeled with a target node class, an association relationship existing between a neighbor node in the neighbor node subset and a target node in the target node subset;

an extraction module, configured to extract a node feature subset of the target node subset based on the neighbor node subset by using a node classification model, the node feature subset including a node feature vector of the target node;

a prediction module, configured to perform class prediction for the target node according to the node feature subset, to obtain a predicted class probability subset; and a training module, configured to train a target model parameter of the node classification model according to the predicted class probability subset and the target node class of the target node.

According to another aspect, a computer device is provided, including a processor and a memory, the memory storing at least one instruction, at least one segment of program, a code set, or an instruction set, the at least one instruction, the at least one segment of program, the code set or the instruction set being loaded and executed by the processor to implement the node classification method or the model training method according to any one of the foregoing embodiments of this application.

According to another aspect, a computer-readable storage medium is provided, storing at least one instruction, at least one segment of program, a code set, or an instruction set, the at least one instruction, the at least one segment of program, the code set or the instruction set being loaded and executed by a processor to implement the node classification method or the model training method according to any one of the foregoing embodiments of this application.

According to another aspect, a computer program product is provided, the computer program product, when run on a computer, causing the computer to perform the node classification method or the model training method according to any one of the foregoing embodiments of this application.

It can be seen from the foregoing technical solutions that the embodiments of this application have the following advantages.

In the embodiments of this application, when features of nodes are updated in a process of node classification, a to-be-classified node is selected from a target node set, and a node feature of the to-be-classified node is determined according to a neighbor node set of the to-be-classified node, to obtain a node classification result according to the node feature. By means of this method, for a large-scale graph, each iterative calculation involves some of the nodes in the graph and does not require traversing each node in the graph, thereby greatly reducing computational overheads and saving computing resources.

BRIEF DESCRIPTION OF THE DRAWINGS

To describe the technical solutions in the embodiments of this application more clearly, the accompanying drawings required for describing the embodiments are briefly described below. Apparently, the accompanying drawings in the following description show only some embodiments of this application, and a person of ordinary skill in the art may still derive other drawings according to the accompanying drawings without creative efforts.

DESCRIPTION OF EMBODIMENTS

Embodiments of this application provide a node classification method and a model training method and apparatus. For a large-scale graph, training may be performed based on only some nodes. Each iterative calculation involves some of the nodes in the graph and does not require traversing each node in the graph, thereby greatly reducing computational overheads and saving computing resources.

In the specification, claims, and accompanying drawings of this application, the terms "first", "second", "third", "fourth", and the like (if existing) are intended to distinguish between similar objects rather than describe a specific order or sequence. It may be understood that the data termed in such a way is interchangeable in proper circumstances, so that the embodiments of this application described herein, for example, can be implemented in other orders than the order illustrated or described herein. Moreover, the terms "include", "comprise", and any other variants thereof are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
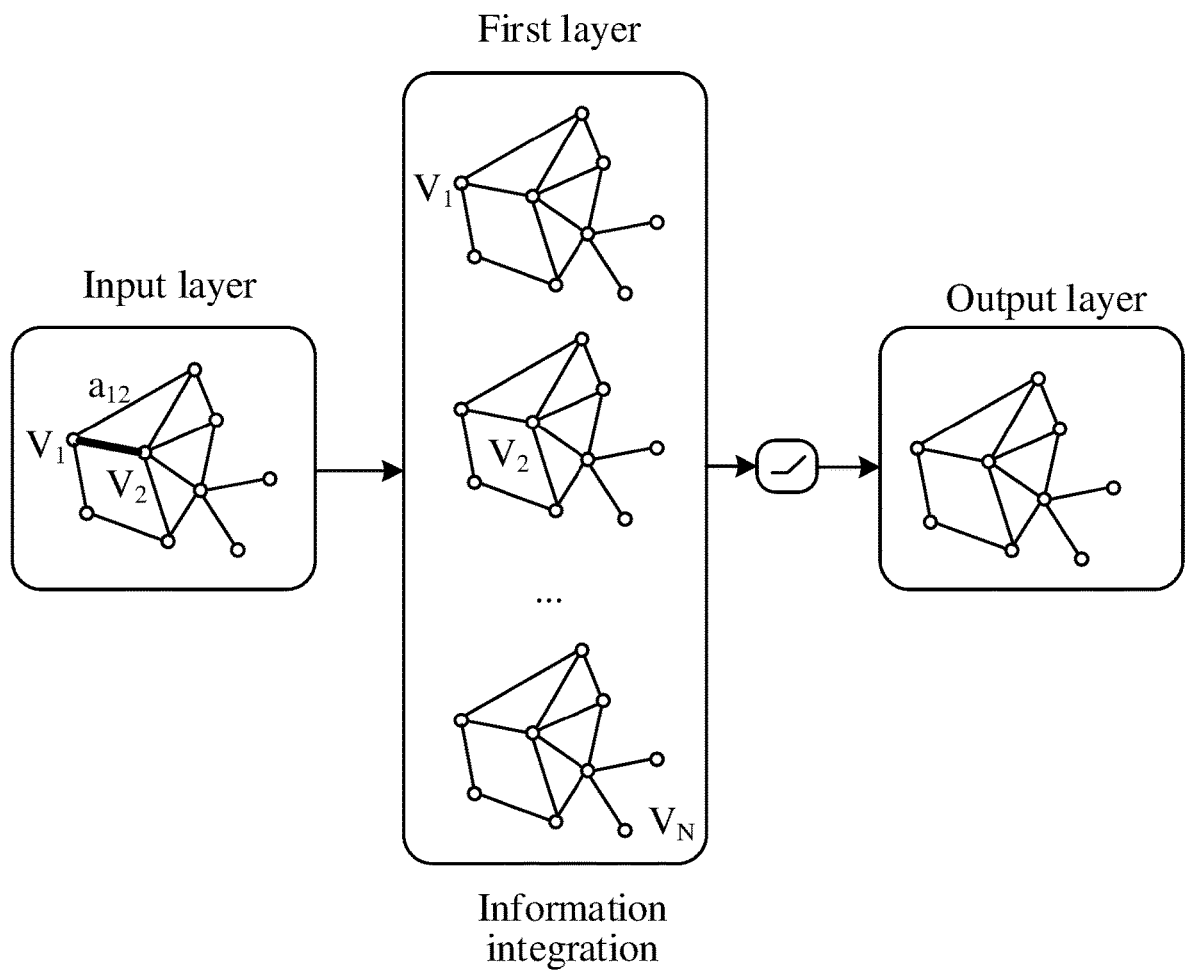
FIG. 1 is a schematic diagram of a GCN classification model for graph node classification in the related art.
Figure 2:
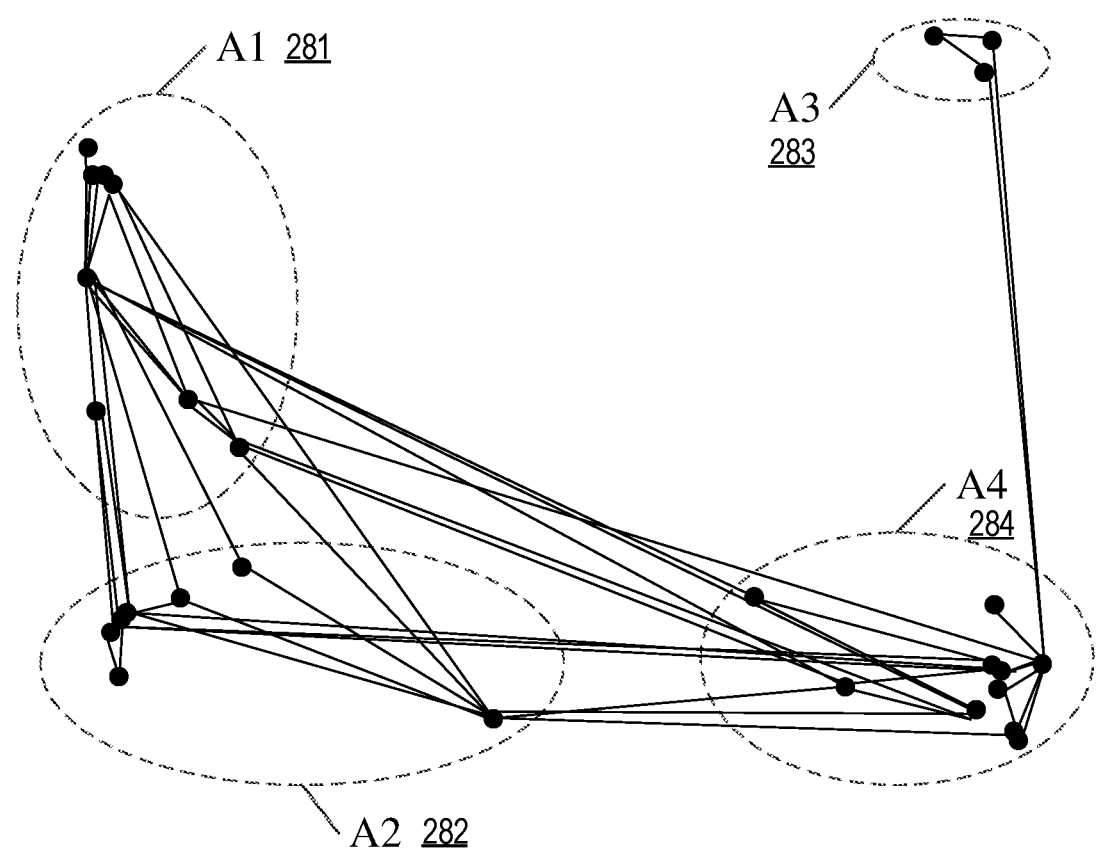
FIG. 2 is a schematic diagram of a large-scale graph according to an embodiment of this application.

It is to be understood that the embodiments of this application are mainly applicable to large-scale graphs, through which nodes of large-scale graphs can be classified and learned. A graph refers to a data structure formed by connections between numerous nodes. FIG. 2 is a schematic diagram of a large-scale graph according to an embodiment of this application. As shown in the figure, each node represents a member. A line connecting two nodes is referred to as an edge. The edge is used for representing that two members corresponding to the two connected nodes know each other. Members indicated by A1 (281) belong to the same class. Members indicated by A2 (282) belong to the same class. Members indicated by A3 (283) belong to the same class. Members indicated by A4 (284) belong to the same class.

Optionally, a node usually is a person or an organization. A connection (an edge) between nodes generally represents a social relationship (for example, a kinship relationship or a transaction action). A feature vector may be assigned to each node. For example, a feature vector of a node V is h (v), and is used for describing an attribute of the node. Each edge may have a weight value a that is used for describing a compact degree of a connection. A larger weight value a indicates a more compact association between nodes. Each edge may be directional to indicate the directivity of a connection. Optionally in some embodiments of the present disclosure, the directivity of an edge of a graph may not be limited to one simple type, for example but not limited to, no direction, one direction (uni-direction), two directions (bi-direction), and/or any arbitrary combination of the above types.

In an actual application, to implement functions such as user recommendation, classification of friends and network security surveillance system monitoring, nodes in a graph also need to be classified. That is, a task of classifying similar nodes into the same class according to feature vectors of nodes and a connection relationship between nodes is referred to as graph node classification. That is, the node v is classified into a class c (v). For example, in a social application program (a large-scale graph), users may be classified into fans of different sports according to user portraits and friend relationships of the users, for example, basketball fans, football fans, or volleyball fans.

The embodiments of the present disclosure may not be limited to the scenarios discussed above, and may have a much wider application than any of the several scenarios mentioned above. For example, the embodiments of the present disclosure may also be applicable to capturing of users of black industries (or "under the table" industries, for example, pyramid selling and gambling) in a payment network, or may be applied to scenarios such as classification of friends, relationship mining, and product recommendation.

Figure 3:
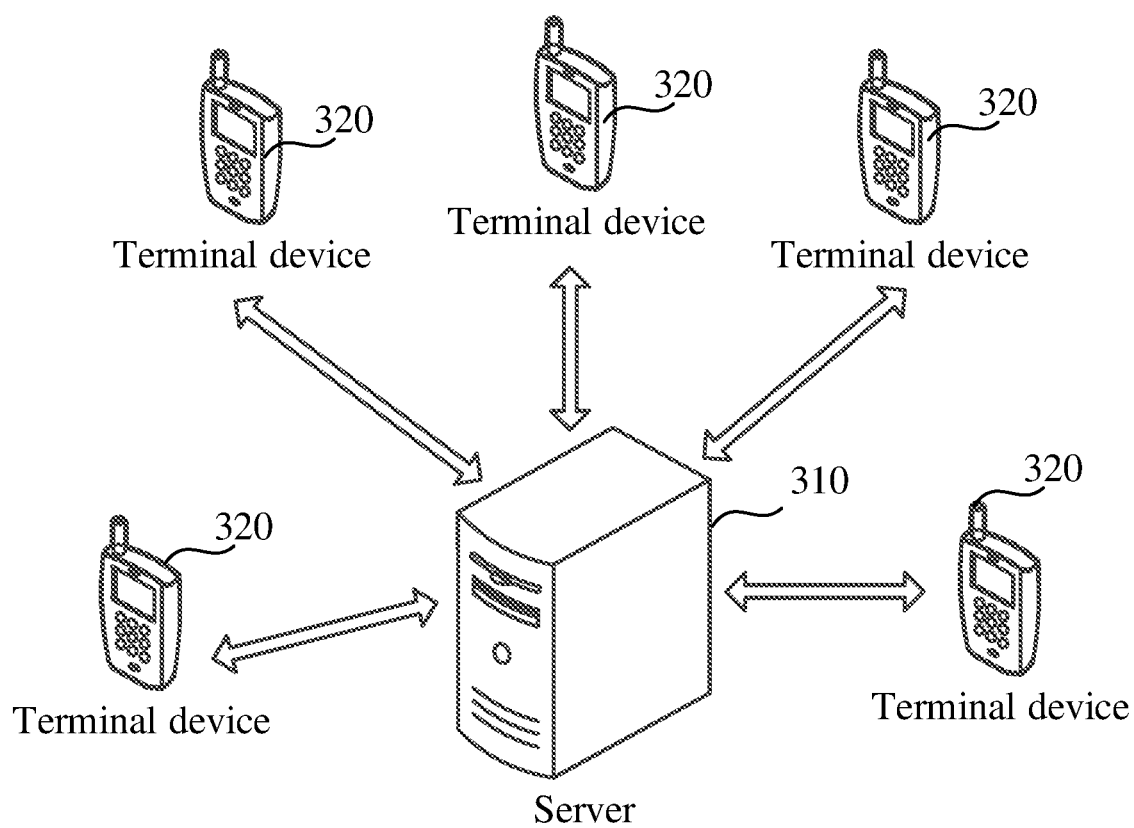
FIG. 3 is a schematic architectural diagram of a node classification system according to an embodiment of this application.

It is to be understood that the node classification system described in the embodiments of this application is shown in FIG. 3. FIG. 3 is a schematic architectural diagram of a node classification system according to an embodiment of this application. The node classification method and the model training method are both deployed in a server 310, and the server 310 receives information transmitted by a large quantity of terminal devices 320. If one terminal device 320 corresponds to one user, each user is represented as one node. Information (for example, social information) about the user is indicated as node information. The server acquires node information corresponding to a large quantity of nodes, to form a large-scale graph. It can be understood that the server 310 shown in FIG. 3 may be one server, or may be a system integrating a plurality of servers. The terminal devices 320 include, but are not limited to a smart mobile phone, a tablet computer, a personal computer (PC), a notebook computer, and a palmtop computer. This is merely an example herein, and is not to be construed as a limitation on this application.

Figure 4:
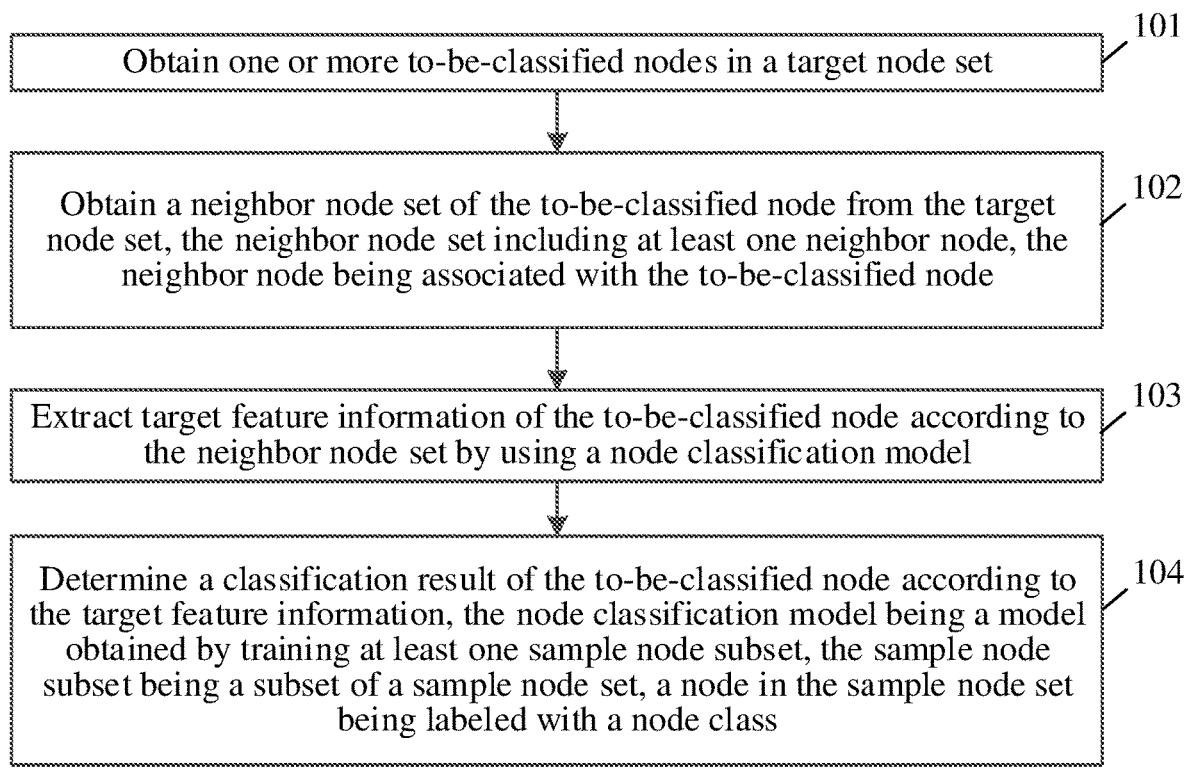
FIG. 4 is a schematic diagram of an embodiment of a node classification method according to an embodiment of this application.

With reference to the foregoing description, the node classification method in this application is described. FIG. 4 is a flowchart of a node classification method according to an exemplary embodiment of this application. Description is made by using an example in which the method is applied to the server 310 shown in FIG. 3. The method includes the following steps:

101: Obtain one or more to-be-classified nodes in a target node set.

Optionally, the one or more to-be-classified nodes include at least one node in the target node set, and a quantity of the one or more to-be-classified nodes is less than a quantity of nodes in the target node set.

Optionally, some nodes are selected as the to-be-classified nodes from the target node set.

In this embodiment, the server needs to obtain the to-be-classified node first. One node corresponds to one user in a graph. Therefore, the to-be-classified node may be further considered as a target user that needs to be classified into a class.

102: Obtain a neighbor node set of the to-be-classified node from the target node set, the neighbor node set including at least one neighbor node, the neighbor node being associated with the to-be-classified node. An association relationship exists between the neighbor node and the to-be-classified node.

In this embodiment, after the server obtains the to-be-classified node, the at least one neighbor node associated with the to-be-classified node may be obtained according to the to-be-classified node. The neighbor nodes form a neighbor node set. Using an example in which the to-be-classified node is a target user, a neighbor node related to the target user may usually be a friend of the target user.

It can be understood that the neighbor node may be a node in direct association (that is, an edge exists between the to-be-classified node and the neighbor node) with the to-be-classified node, or may be a node in indirect association with the to-be-classified node. This is not limited herein.

Optionally, the neighbor nodes in the neighbor node set of the to-be-classified node are nodes having association relationships with at least two to-be-classified nodes or nodes having association relationships with n to-be-classified nodes, n being a positive integer.

Optionally, when the neighbor node set is determined, a first candidate probability of each candidate neighbor node in the target node set is calculated first according to the to-be-classified node, and the neighbor node set is determined according to the first candidate probability of the each candidate neighbor node. The first candidate probability of a $u^{th}$ candidate neighbor node is determined according to an edge weight between the to-be-classified node and the $u^{th}$ candidate neighbor node and an edge weight between the to-be-classified node and a node in the target node set, u being a positive integer. In one implementation, a candidate neighbor node is determined to be included in the neighbor node set when the first candidate probability of the candidate neighbor node is larger or equal to a preset threshold. In another implementation, a candidate neighbor node is determined to be included in the neighbor node set when the first candidate probability of the candidate neighbor node is one of the k largest number for all candidate neighbor nodes, wherein k may be a positive integer, for example but not limited to, k=1, 2, 3, 5, 7, 10, and etc.

Optionally, the first candidate probability of a $u^{th}$ candidate neighbor node is determined based on a first summation of each edge weight between each node of the to-be-classified node and the $u^{th}$ candidate neighbor node, and also based on a second summation of each edge weight between each node of the to-be-classified node and each node of the target node set, For example, the first candidate probability of a $u^{th}$ candidate neighbor node is determined as a ratio between the first summation and the second summation. For a manner of calculating the first candidate probability of the candidate neighbor node, formula 1 may be described below:

$$p(u) = \frac{\sum_{i=1}^{b} a_{w_i u}}{\sum_{j=1}^{N} \sum_{i=1}^{b} a_{w_i v_j}}, \qquad \text{formula 1}$$

where p (u) represents the first candidate probability of the $u^{th}$ candidate neighbor node, $v_j$ represents the $j^{th}$ node in the target node set, w represents the to-be-classified node, b represents a quantity of the to-be-classified nodes, N represents a quantity of nodes in the target node set, i represents an integer from 1 to b, j represents an integer from 1 to N, $a_{w_i u}$ represents an edge weight between an $i^{th}$ to-be-classified node and the $u^{th}$ candidate neighbor node, and $a_{w_i v_j}$ represents an edge weight between the $i^{th}$ to-be-classified node and the $j^{th}$ node in the target node set.

In this embodiment, to-be-classified nodes are obtained first from the target node set corresponding to a large-scale graph, and then only the to-be-classified nodes are updated each time. In addition, a specific quantity of common associated nodes (that is, the neighbor node set) are acquired according to the to-be-classified nodes for information integration.

Using an example in which the to-be-classified node is a target user, a neighbor node related to the target user may usually be a friend of the target user. It can be understood that the neighbor node may be a node in direct association (that is, an edge exists between the to-be-classified node and the neighbor node) with the to-be-classified node, or may be a node in indirect association with a target node. This is not limited herein.

103: Extract target feature information of the to-be-classified node according to the neighbor node set by using a node classification model.

In this embodiment, the server may enhance a feature of the to-be-classified node based on the neighbor node set, to obtain the target feature information corresponding to the to-be-classified node.

Specifically, the target feature information of the to-be-classified node may be obtained by using formula 2 below:

$$h'(v_1) = \sum_{n=1}^{d} a_{v_1 u_n}(h(u_n)W_1), n = 1, \ldots, d, \qquad \text{formula 2}$$

where $v_1$ represents the to-be-classified node, $h'(v_1)$ represents the target feature information (that is, a feature vector) of the to-be-classified node, d represents a quantity of nodes in a neighbor node set, n represents an integer from 1 to d, $u_n$ represents an $n^{th}$ neighbor node, $h(u_n)$ represents a multi-dimensional feature vector of the $n^{th}$ neighbor node, $a_{v_1 u_n}$ represents an edge weight between the to-be-classified node and the $n^{th}$ neighbor node, and $W_1$ represents a model parameter of the node classification model.

In view of the above, to update the target feature information of the to-be-classified node, neighbor nodes corresponding to the to-be-classified node may be multiplied by a model parameter, and then summation is performed to obtain the target feature information, so that features of all the neighbor nodes of the to-be-classified node are integrated in the updated target feature information, and an amount of information is enriched.

104: Determine a classification result of the to-be-classified node according to the target feature information, the node classification model being a model obtained by training at least one sample node subset, the sample node subset being a subset of a sample node set, a node in the sample node set being labeled with a node class.

In this embodiment, after obtaining the target feature information through the calculation, the node classification model outputs the classification result corresponding to the to-be-classified node according to the target feature information. For example, the outputted classification result is that the to-be-classified node is an abnormal node. Alternatively, the outputted classification result is that the to-be-classified node is a node of basketball fans.

The node classification model is obtained by training at least one sample node subset. A quantity of nodes of each sample node subset is less than a quantity of the nodes of the sample node set. In other words, the node classification model is trained based on some nodes, and each iterative calculation involves some of the nodes until a quantity of iterations reaches a threshold. In machine learning, a classification model is to output a corresponding class after performing information integration on input data. The classification model includes a set of model parameters. The model parameters may be optimized and adjusted through training.

In an actual application, in the machine learning method, a model parameter of each node usually needs to be updated through a plurality of iterations, and each iteration is intended for a to-be-classified node sampled from the target node set. Although each iteration uses only a small portion of data, all nodes in the target node set can be traversed after a plurality of iterations (a different to-be-classified node is obtained in each of the iterations).

In this embodiment of this application, a node classification method is provided. In a process of node classification, when features of nodes are updated, a to-be-classified node is selected from a target node set, and a node feature of the to-be-classified node is determined according to a neighbor node set of the to-be-classified node, to obtain a node classification result according to the node feature. By means of this method, for a large-scale graph, each iterative calculation involves some of the nodes in the graph and does not require traversing each node in the graph, thereby greatly reducing computational overheads and saving computing resources.

Figure 5:
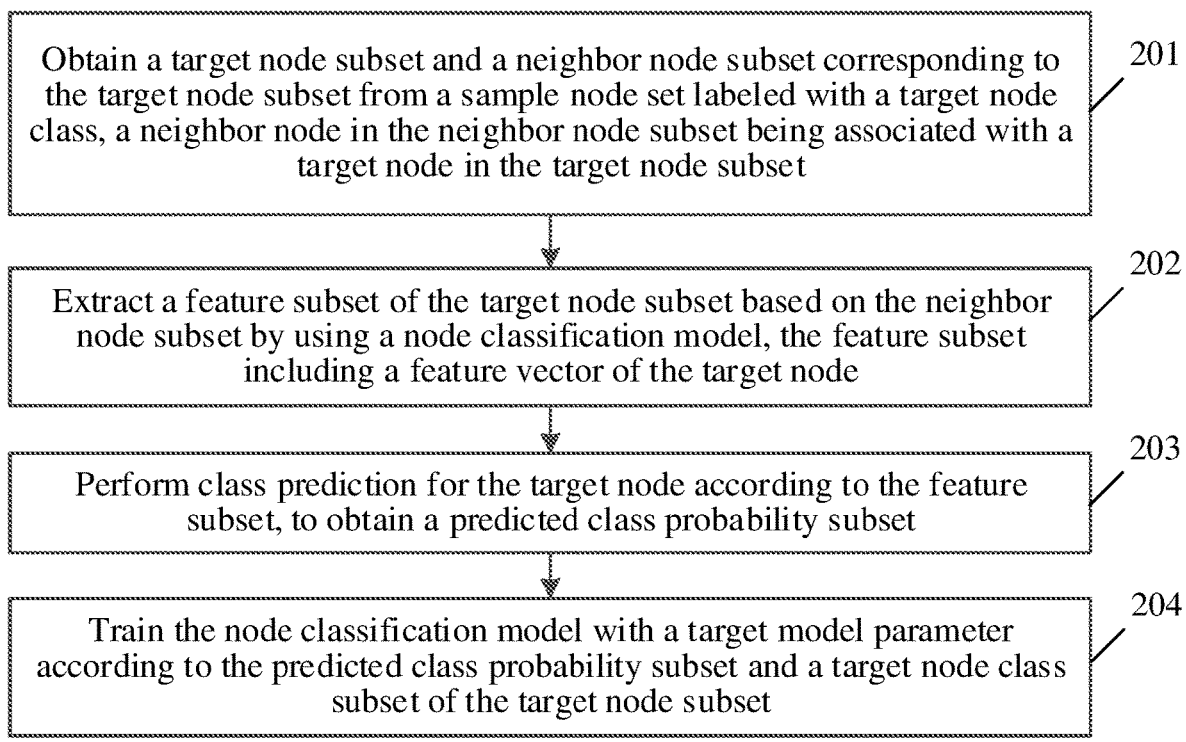
FIG. 5 is a schematic diagram of an embodiment of a model training method according to an embodiment of this application.

For the foregoing node classification model, a process of training the node classification model is described. FIG. 5 is a flowchart of a model training method according to an exemplary embodiment of this application. Description is made by using an example in which the method is applied to the server 310 shown in FIG. 3. Referring to FIG. 5, the method includes the following steps:

201: Obtain a target node subset and a neighbor node subset corresponding to the target node subset from a sample node set labeled with a target node class, a neighbor node in the neighbor node subset being associated with a target node in the target node subset. An association relationship exists between a neighbor node in the neighbor node subset and a target node in the target node subset. In one implementation, each neighbor node in the neighbor node subset may be associated with at least one target node in the target node subset.

In this embodiment, sample nodes are obtained first from the sample node set corresponding to a large-scale graph, and then only some nodes (that is, the target node subset) are updated each time. In addition, a specific quantity of common associated nodes (that is, the neighbor node subset) are acquired according to the nodes (that is, the target node subset) for information integration.

Figure 6:
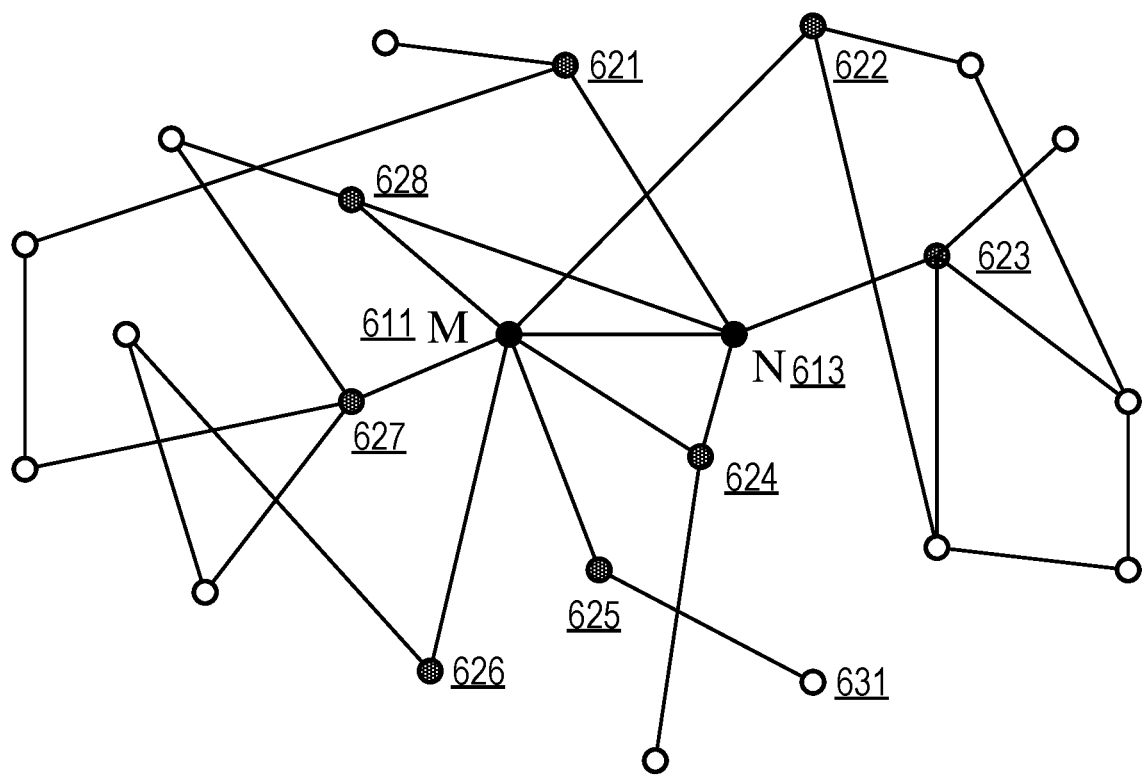
FIG. 6 is a schematic diagram of an embodiment in which nodes of a graph are sampled according to an embodiment of this application.

For ease of understanding, FIG. 6 is a schematic diagram of an embodiment in which nodes of a graph are sampled according to an embodiment of this application. As shown in the figure, it is assumed that a sample node subset including 10 nodes is obtained from the sample node set. The sample node subset includes two target nodes (that is, a node M 611 and a node N 613 in the figure), and eight neighbor nodes (that is, nodes having a dot pattern in the figure, 621, 622, 623, 624, 625, 626, 627, and 628) associated with the two target nodes are obtained according to the target nodes. White nodes (631) in FIG. 6 belong to the nodes in the sample node set, but are not selected as objects in this training.

Using an example in which the target node is a target user, a neighbor node related to the target user may usually be a friend of the target user. It can be understood that the neighbor node may be a node in direct association (that is, an edge exists between the target node and the neighbor node) with the target node, or may be a node in indirect association with the target node. This is not limited herein.

Optionally, a manner of obtaining the target node subset and the neighbor node subset includes: obtaining the target node subset from the sample node set; calculating a second candidate probability of each to-be-selected neighbor node in the sample node set according to the target node subset; and determining the neighbor node subset according to the second candidate probability of the each to-be-selected neighbor node. In one implementation, a to-be-selected neighbor node is determined to be included in the neighbor node subset when the second candidate probability of the to-be-selected neighbor node is larger or equal to a preset threshold. In another implementation, a to-be-selected neighbor node is determined to be included in the neighbor node subset when the second candidate probability of the candidate neighbor node is one of the k largest number for all candidate neighbor nodes, wherein k may be a positive integer, for example but not limited to, k=1, 2, 3, 5, 7, 10, and etc The second candidate probability of a $u^{th}$ to-be-selected neighbor node is determined according to an edge weight between the target node in the target node subset and the $u^{th}$ to-be-selected neighbor node and an edge weight between the target node and a node in the sample node set, u being a positive integer. In one implementation, the second candidate probability of a $u^{th}$ candidate neighbor node is determined based on a first summation of each edge weight between each node of the target node subset and the $u^{th}$ to-be-selected neighbor node, and also based on a second summation of each edge weight between each node of the target node subset and each node of the sample node set, For example, the first candidate probability of a $u^{th}$ candidate neighbor node is determined as a ratio between the first summation and the second summation. Optionally, for a manner of selecting the to-be-selected neighbor node, refer to formula 1 shown in step 102. Details are not described again in this embodiment.

Optionally, there may be a relatively large quantity of nodes associated with the target node. In this case, a probability of each to-be-selected neighbor node in the sample node set needs to be calculated according to the target node subset, and then one or more to-be-selected neighbor nodes having relatively larger probabilities are selected as the neighbor node subset.

During each training, the selected target nodes are not the same, but the selected neighbor nodes may be the same. The target nodes during sampling are selected randomly. As a result, there may be a quite small quantity of common neighbors of the target nodes sampled under an extreme condition. In this case, non-common neighbor nodes may be used as neighbor nodes.

202: Extract a feature subset of the target node subset based on the neighbor node subset by using a node classification model, the feature subset including a feature vector of the target node.

In this embodiment, the server uses the neighbor node subset to update a feature of each target node in the target node subset according to the target node subset and the neighbor node subset, and each target node corresponds to one feature vector, so that feature vectors of the target nodes form a feature subset.

203: Perform class prediction for the target node according to the feature subset, to obtain a predicted class probability subset.

In this embodiment, after obtaining the target node subset and the feature subset, the server may obtain a predicted class probability of each target node through calculation according to the each target node and a feature vector corresponding to the each target node. Predicted class probabilities of the target nodes form a predicted class probability subset.

The predicted class probability is used for representing a probability that a target node is predicted to belong to a class. Therefore, during the prediction, a class corresponding to a largest selection probability is usually selected as the class of the target node.

204: Train the node classification model with a target model parameter of the node classification model according to the predicted class probability subset and a target node class subset of the target node subset.

In this embodiment, the server adjusts the target model parameter of the node classification model according to a difference between the predicted class probability subset and the target node class.

The target model parameter may correspond to an initialized value, that is, a pre-defined parameter. Alternatively, the target model parameter may be a model parameter obtained by performing calculation for a node sampled last time. This is equivalent to that the target model parameter is optimized by using the predicted class probability of the each target node, to obtain a target model parameter closer to a target model parameter corresponding to an actual model.

In this embodiment, finally, the server obtains the node classification model through training by using a second model parameter obtained in this training.

In an actual application, in the machine learning method, a model parameter usually needs to be trained through a plurality of iterations, and each iteration needs only a relatively small sampled node set. Although each iteration uses only a small portion of data, after a plurality of iterations (each iteration uses different data, that is, sampled target nodes used in each iteration training are different, and neighbor nodes are not completely the same), all the nodes in the gram can be traversed.

In this embodiment of this application, a model training method based on a large-scale graph is provided. First, a server obtains a sample node subset from a sample node set, and then determines a feature vector subset according to the sample node subset. Then, the server determines a predicted class probability subset according to a target node subset and the feature vector subset. The predicted class probability subset includes at least one predicted class probability. A correspondence exists between the predicted class probability and a target node. Finally, the server determines a second model parameter according to the predicted class probability subset and a first model parameter, and obtains a node classification model through training according to the second model parameter. In the following manner, for a large-scale graph, training may be performed based on only some nodes. Each iterative calculation involves some of the nodes in the graph and does not require traversing each node in the graph, thereby greatly reducing computational overheads and saving computing resources.

Figure 7:
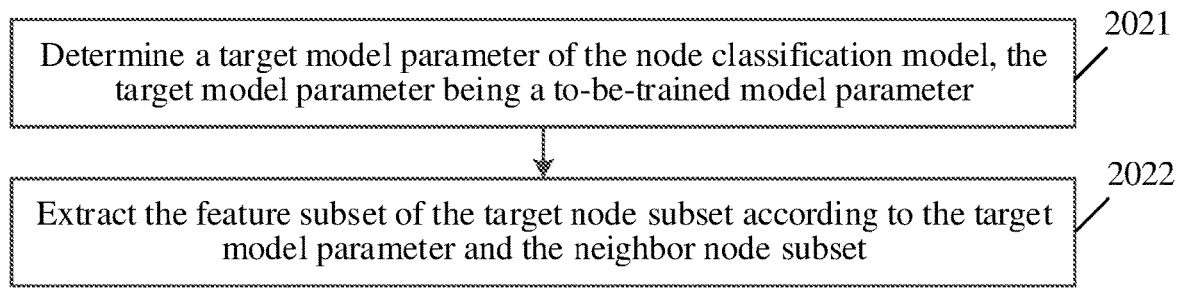
FIG. 7 is a schematic flowchart of performing model training on graph nodes according to an embodiment of this application.

Optionally, based on the foregoing embodiment corresponding to FIG. 5, in an optional embodiment of a model training method provided in this embodiment of this application, the feature subset of the target node subset is extracted based on the neighbor node subset by using a node classification model. That is, step 202 may further include the following steps 2021 and 2022, referring to FIG. 7:

2021: Determine the target model parameter of the node classification model, the target model parameter being a to-be-trained model parameter.

2022: Extract the feature subset of the target node subset according to the target model parameter and the neighbor node subset.

Optionally, when the feature subset is calculated according to the target model parameter and the neighbor node subset, for an $i^{th}$ target node, a node feature of the $i^{th}$ target node is determined according to an edge weight between the $i^{th}$ target node and a neighbor node, a feature vector of the neighbor node, and the target model parameter, i being a positive integer. For example, for the calculation process, refer to formula 3 below:

$$h'(w_i) = \sum_{j=1}^{b} a_{w_i u_j}(h(u_j)W'), j = 1, \ldots, b, \quad \text{formula 3}$$

where $w_i$ represents the $i^{th}$ target node, $h'(w_i)$ represents the node feature of the $i^{th}$ target node, b represents a quantity of nodes of the neighbor node subset, j represents an integer from 1 to b, $u_j$ represents a $j^{th}$ neighbor node, h ($u_j$) represents a feature vector of the $j^{th}$ neighbor node, $a_{w_i u_j}$ represents an edge weight between the $i^{th}$ target node and the $j^{th}$ neighbor node, and W' represents the target model parameter.

Figure 8:
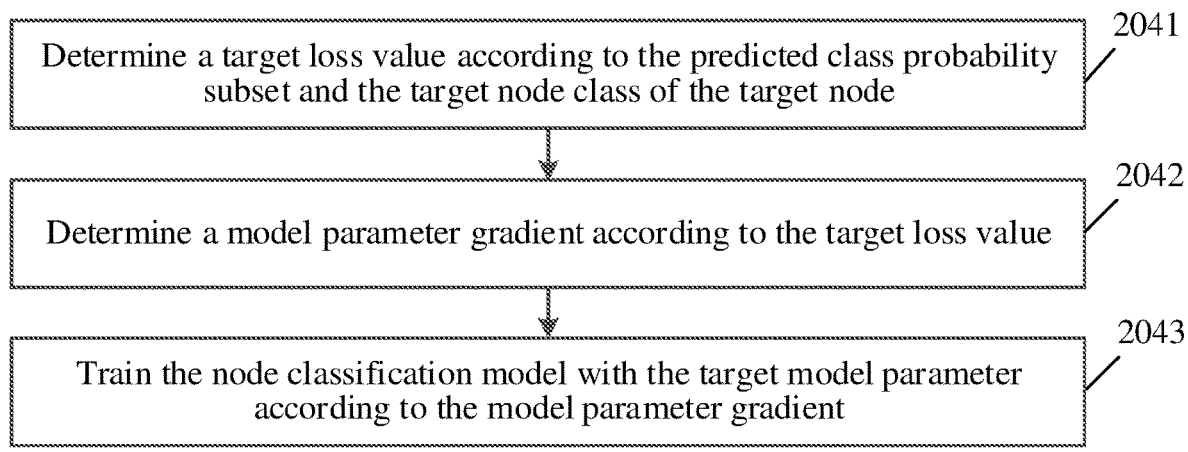
FIG. 8 is a flowchart of training a target model parameter of a node classification model according to a predicted class probability subset and a target node class of a target node according to an embodiment of this application.

Optionally, based on the embodiment corresponding to FIG. 5, in an optional embodiment of the model training method provided in this embodiment of this application, the target model parameter of the node classification model is trained according to the predicted class probability subset and the target node class of the target node. That is step 204 may further include the following steps 2041 and 2043, referring to FIG. 8:

2041: Determine a target loss value according to the predicted class probability subset and the target node class of the target node.

Optionally, the target loss value is a value obtained through calculation based on a loss function or a cost function. Either the loss function or the cost function may be used for measuring a prediction error degree. In other words, to determine whether an algorithm is evaluated as a relatively desirable algorithm, a loss function needs to be pre-defined to determine whether the algorithm is the optimal, followed by continuous optimization via gradient descent, to minimize the loss function.

Optionally, for a manner of calculating the target loss value, refer to formula 4 below:

$$L = -\frac{1}{b}\sum_{i=1}^{b} \ln p_{c(w_i)}(w_i) = -\frac{1}{b}\sum_{i=1}^{b} \ln \frac{\exp(h^1_{c(w_i)}(w_i))}{\sum_{k}^{n} \exp(h^1_k(w_i))},  \quad \text{formula 4}$$

where L represents the target loss value, b represents a quantity of nodes of the target node subset, i represents an integer from 1 to b, $w_i$ represents an $i^{th}$ target node, $h^1(w_i)$ represents n-dimensional feature vectors of the $i^{th}$ target node, $h_k^{1}(w_i)$ represents a $k^{th}$-dimensional feature vector of the $i^{th}$ target node, exp( ) represents an exponential function, $h_{c(w_i)}(w_i)$ represents a $c(w_i)^{th}$ component of $h^1(w_i)$, $c(w_i)$ represents actual class information of the $i^{th}$ target node, and $P_{c(w_i)}$ represents that a $k^{th}$ predicted class probability of the $i^{th}$ target node is equal to a probability of the actual class information.

Optionally, for a manner of calculating the predicted class probability of the $i^{th}$ target node, refer to formula 5 below:

$$p_k(w_i) = \frac{\exp(h^1_k(w_i))}{\sum_{k} \exp(h^1_k(w_i))}, i = 1, \ldots, b. \quad \text{formula 5}$$

Optionally, during the prediction, a class corresponding to a largest probability is selected as a class of the target node, that is:

$$c'(w_i) = \operatorname*{argmax}_{k} p_k(w_i),$$

where $c'(w_i)$ represents a predicted class of the $i^{th}$ target node.

2042: Determine a model parameter gradient according to the target loss value.

Optionally, for a manner of calculating the model parameter gradient, refer to formula 6 below:

$$\nabla W = [\nabla W_1, \nabla W_2, \ldots, \nabla W_n]. \quad \text{formula 6}$$

where $\nabla W$ represents the model parameter gradient. For a manner of calculating each $\nabla W_k$, refer to formula 7 below:

$$\nabla W_k = \quad \text{formula 7}$$

$$\frac{\partial L}{\partial W_k} = \frac{1}{b}\sum_{i=1}^{b}\sum_{j=1}^{b}\left(\frac{\exp(h^1_k(w_i))}{\sum_{k}^{n} \exp(h^1_k(w_i))} - \delta(k = c(w_i))\right)h(u_j),$$

where L represents the target loss value, $\nabla W_k$ represents a gradient of a $k^{th}$-dimensional feature vector, n represents a quantity of dimensions of a feature vector of the $i^{th}$ target node, b represents a quantity of nodes of the target node subset, i represents an integer from 1 to b, j represents an integer from 1 to b, $h_k^{1}(w_i)$ represents a $k^{th}$-dimensional feature vector of the $i^{th}$ target node, c) represents actual class information of the $i^{th}$ target node, $\delta(\ )$ represents a determining function, $u_j$ represents a $j^{th}$ neighbor node, $h(u_j)$ represents a feature vector of the $j^{th}$ neighbor node, and exp( ) represents an exponential function.

Optionally, a derivation process of the model parameter gradient is as follows.

$$\nabla W_k = \frac{\partial L}{\partial W_k}$$

$$= \frac{1}{b}\frac{\partial}{\partial W_k}\left(-\sum_{i=1}^{b} \ln \frac{\exp(h^1_{c(w_i)}(w_i))}{\sum_{k}^{n} \exp(h^1_k(w_i))}\right)$$

$$= \frac{1}{b}\frac{\partial}{\partial W_k}\sum_{i=1}^{b}\left(\ln \sum_{k}^{n} \exp(h^1_k(w_i)) - \ln \exp(h^1_{c(w_i)}(w_i))\right)$$

$$= \frac{1}{b}\frac{\partial}{\partial W_k}\sum_{i=1}^{b}\left(\ln \sum_{k}^{n} \exp(h^1_k(w_i)) - h^1_{c(w_i)}(w_i)\right)$$

$$= \frac{1}{b}\sum_{i=1}^{b}\left(\frac{\partial}{\partial W_k}\ln \sum_{k}^{n} \exp(h^1_k(w_i)) - \frac{\partial}{\partial W_k}h^1_{c(w_i)}(w_i)\right)$$

$$= \frac{1}{b}\sum_{i=1}^{b}\left(\frac{\exp(h^1_k(w_i))}{\sum_{k}^{n} \exp(h^1_k(w_i))}\frac{\partial}{\partial W_k}h^1_k(w_i) - \frac{\partial}{\partial W_k}h^1_{c(w_i)}(w_i)\right)$$

$$= \frac{1}{b}\sum_{i=1}^{b}\left(\frac{\exp(h^1_k(w_i))}{\sum_{k}^{n} \exp(h^1_k(w_i))}\frac{\partial}{\partial W_k}\sum_{j=1}^{b}a_{w_i u_j}h(u_j)W_k - \frac{\partial}{\partial W_k}h(u_j)W_{c(w_i)}\right)$$

$$= \frac{1}{b}\sum_{i=1}^{b}\left(\frac{\exp(h^1_k(w_i))}{\sum_{k}^{n} \exp(h^1_k(w_i))}\sum_{j=1}^{b}a_{w_i u_j}h(u_j) - \sum_{j=1}^{b}a_{w_i u_j}h(u_j)\frac{\partial}{\partial W_k}W_{c(w_i)}\right)$$

$$= \frac{1}{b}\sum_{i=1}^{b}\sum_{j=1}^{b}\left(\frac{\exp(h^1_k(w_i))}{\sum_{k}^{n} \exp(h^1_k(w_i))} - \delta(k = c(w_i))\right)h(u_j)$$

2043: Train the node classification model with the target model parameter according to the model parameter gradient.

Optionally, a product of the model parameter gradient and a preset learning rate is used as an adjustment difference of the target model parameter; and the target model parameter is adjusted by using the adjustment difference.

Optionally, for a manner of adjusting the target model parameter, refer to formula 8 below:

$$W = W' - \alpha \nabla W, \quad \text{formula 8:}$$

where W represents the target model parameter after the adjustment, W' represents the model parameter before the adjustment, α represents the preset learning rate, and $\nabla W$ represents the model parameter gradient.

Optionally, in a process of model training, a dynamically changeable learning rate may be generally set according to a quantity of rounds of training. For example, at the beginning of the model training, the learning rate is controlled within a range of 0.001 to 0.01. The learning rate gradually decreases when a specific quantity of rounds of iteration have been performed. When the training is about to end, the learning rate decreases by 100 times or more.

The learning rate is mainly used for controlling the learning progress of a model. An appropriate learning rate may be selected according to a size of a data set. When a sum of squared errors is used as a cost function, as an amount of data increases, the learning rate is to be set to a correspondingly smaller value.

Different learning rates are selected in different iterations. In an initial iteration, the learning rate may be relatively large. When the training is about to end, the learning rate is lower. In another implementation, when the model parameter for the next iteration is very close to the model parameter for the previous iteration, the learning rate may be smaller. After each iteration, a value of the error function is checked by using an estimated model parameter. If an error rate is lowered when compared with a previous iteration, the learning rate may be improved. If the error rate is improved when compared with the previous iteration, a value of the previous iteration is to be reset, and the learning rate is to be lowered to 50% of a previous one. Therefore, the foregoing description provides a method for adaptively adjusting a learning rate.

A learning rate α in this embodiment may be set to 0.01. In an actual application, the learning rate α may be set to 0.00001, 0.0001, 0.001, 0.003, 0.03, 0.1, 0.3, 1, 3, 10, or the like. This is not limited herein.

Optionally, in this embodiment of this application, a method for training the target model parameter is provided. That is, the server calculates a target loss value according to the predicted class probability subset and an actual class information subset, and then determines the model parameter gradient according to the target loss value, and finally adjusts the model parameter based on the model parameter gradient. By means of this method, the parameters are updated iteratively once based on each sample by using stochastic gradient descent. An optimal solution can be found without traversing all the samples, thereby greatly improving a convergence speed of an algorithm. In addition, a loss function of the each sample is minimized. Although a result of each iteration may not be a global optimal solution, the process keeps developing in this direction, so that a final result is always close to the global optimal solution.

Figure 9:
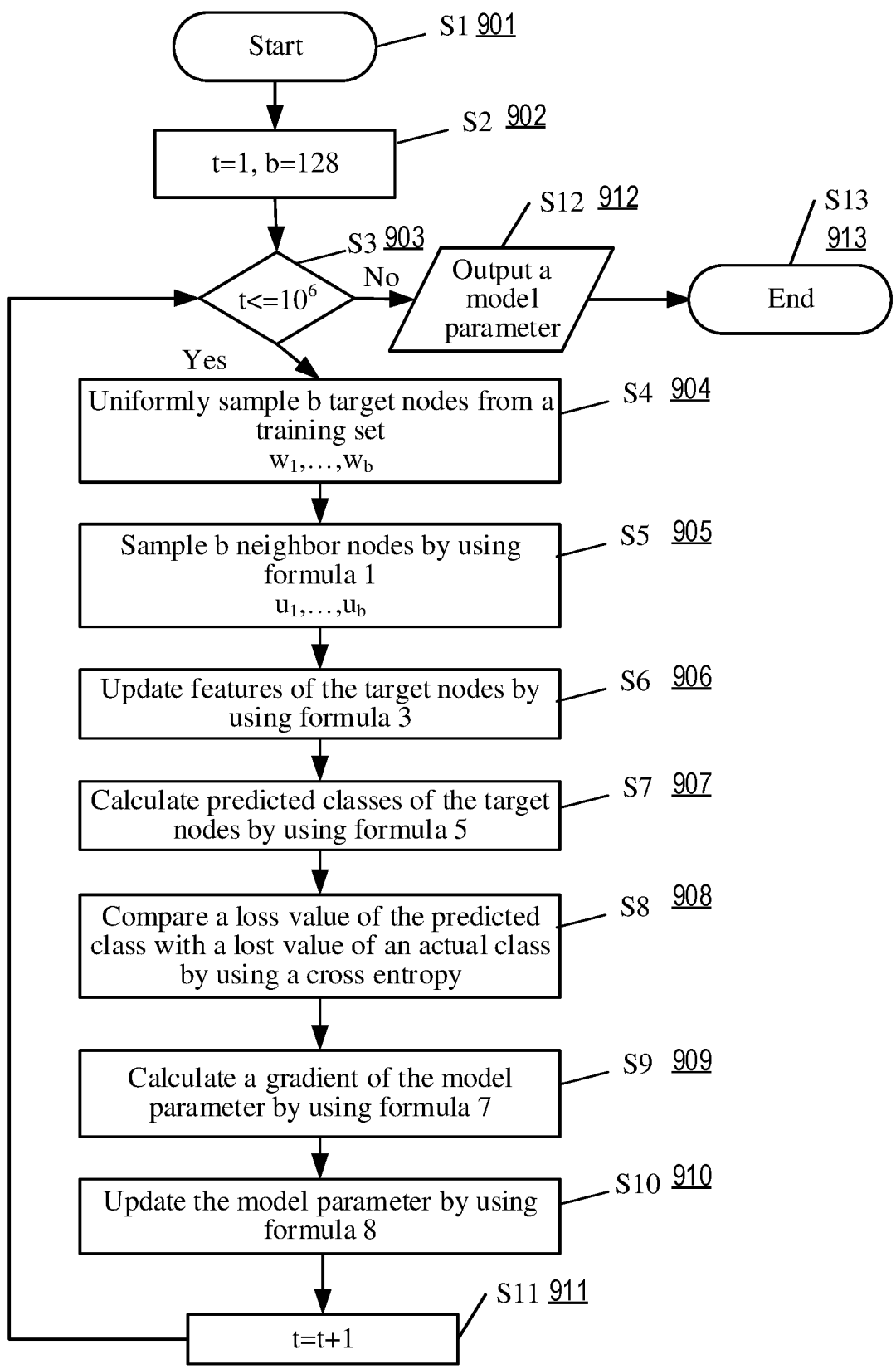
FIG. 9 is a schematic flowchart of performing model training on graph nodes according to an embodiment of this application.

For ease of description, FIG. 9 is a schematic flowchart of performing model training on graph nodes according to an embodiment of this application. As shown in the figure, the process is specifically as follows.

In step S1 (901): a process of the model training is started.

In step S2 (902): t=1 is set on an iteration counter, a quantity b of sampled nodes is set to 128, and the iteration counter records a quantity of iterations executed by a program; when t=1, the program starts executing a first iteration, that is, from step S2 to step S10; then, the quantity of iterations is increased by 1, and whether the quantity of the iterations recorded by the iteration counter reaches $10^6$ is determined, and if the quantity does not reach $10^6$, a second iteration is then performed.

In step S3 (903): whether the quantity of the iterations recorded by the iteration counter is greater $10^6$ is determined. If the quantity of the iterations is greater than $10^6$, step S12 is performed. Otherwise, if the quantity of the iterations is less than $10^6$ or the like, step S4 is performed, another iteration calculation is started.

In step S4 (904): 128 target nodes, that is, $w_1, w_2, \ldots, w_b$, are sampled from the sample node set.

In step S5 (905): 128 neighbor nodes, that is, $u_1, u_2, \ldots, u_b$, are acquired by using the foregoing formula 1.

In step S6 (906): feature vectors $h^1(w_1), \ldots, h^1(w_b)$ of the 128 target nodes are acquired by using the foregoing formula 3.

In step S7 (907): by using the foregoing formula 5, predicted classes of the target) nodes are respectively obtained: $\hat{c}(w_1), \ldots, \hat{c}(w_b)$.

In step S8 (908): a loss value of the predicted class is compared with a lost value of an actual class by using a cross entropy.

In step S9 (909): a gradient of a model parameter is calculated by using the foregoing formula 7.

In step S10 (910): The model parameter is updated by using the foregoing formula 8.

In step S11 (911): the quantity of the iterations recorded by the iteration counter is increased by 1, that is, t=t+1.

In step S12 (912): the model parameter may be outputted when t is greater than $10^6$.

In step S13 (913): the process of the model training is ended.

Based on the model training method provided in this application, an actual social network has been tested. The network has 31965 nodes and 11606919 edges in total. A quantity of dimensions of a feature vector of each node is 602. The network has 41 classes in total. If an edge exists between two nodes, a weight is set to 1. Otherwise, if no edge exists between two nodes, the weight is set to 0. To implement the model training, a training set having 152410 nodes is constructed. Node classes in the training set are known.

In addition, a test set having 55334 nodes is further construed, and is used for testing prediction accuracy of a classification model. At present, a prediction capability of the classification model is evaluated by using the prediction accuracy.

$$acc = \frac{\text{corrects}}{152410},$$

where corrects represents a quantity of nodes with correct class prediction in the test set, acc represents a prediction capability. A larger acc indicates a stronger prediction capability. In addition, an operating speed may also be evaluated based on each training time of a comparison model.

Next, the method used in this embodiment of this application is compared with a GCN used in the existing solution. Referring to table 1, a comparison between the methods under the same test conditions is as follows.

TABLE 1

| Method used | Prediction accuracy | Operating time (s) |
| --- | --- | --- |
| GCN | 0.9568. | 100 |
| This application | 0.9501 | 2 |

It can be seen that the prediction accuracy corresponding to the method used in this embodiment of this application is quite close to the GCN, but the operating time is greatly shortened. Therefore, with a sampling-based hypothesis algorithm, each node feature update is performed based on only a smaller node subset, thereby significantly improving the actual operating speed, and reducing the memory. Based on real social network data, obtained prediction accuracy is close to the GCN, but the speed is increased by about 50 times.

Figure 10:
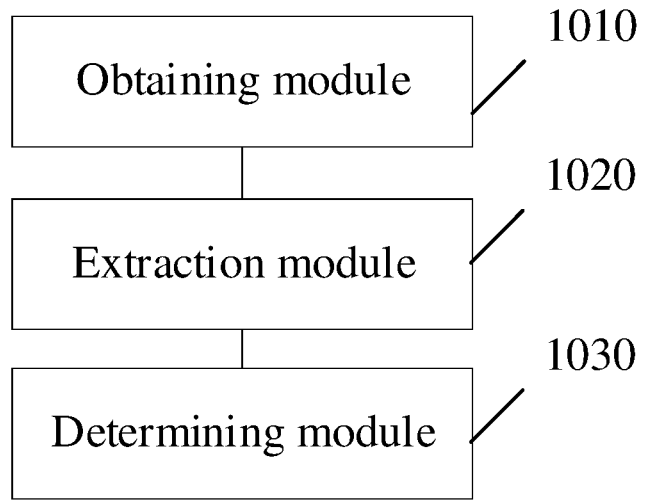
FIG. 10 is a structural block diagram of a node classification apparatus according to an exemplary embodiment of this application.

FIG. 10 is a structural block diagram of a node classification apparatus according to an exemplary embodiment of this application. Using an example in which the apparatus is applicable to a computer device, as shown in FIG. 10, the apparatus includes an obtaining module 1010, an extraction module 1020, and a determining module 1030.

The obtaining module 1010 is configured to obtain one or more to-be-classified nodes in a target node set.

The obtaining module 1010 is further configured to obtain a neighbor node set of the to-be-classified nodes from the target node set, the neighbor node set including at least one neighbor node, the neighbor node being associated with the to-be-classified nodes. An association relationship exists between the neighbor node and the to-be-classified nodes.

The extraction module 1020 is configured to extract target feature information of the to-be-classified node according to the neighbor node set by using a node classification model.

The determining module 1030 is configured to determine a classification result of the to-be-classified node according to the target feature information, the node classification model being a model obtained by training at least one sample node subset, the sample node subset being a subset of a sample node set, a node in the sample node set being labeled with a node class.

In an optional embodiment, the obtaining module 1010 is further configured to calculate a first candidate probability of each candidate neighbor node in the target node set according to the to-be-classified node; and determine the neighbor node set according to the first candidate probability of the each candidate neighbor node.

In an optional embodiment, the obtaining module 1010 is further configured to determine the first candidate probability of a $u^{th}$ candidate neighbor node according to an edge weight between the to-be-classified node and the $u^{th}$ candidate neighbor node and an edge weight between the to-be-classified node and a node in the target node set, u being a positive integer.

In conclusion, when updating features of nodes in a process of node classification, the node classification apparatus provided in this embodiment selects a to-be-classified node from a target node set, and determines a node feature of the to-be-classified node according to a neighbor node set of the to-be-classified node, to obtain a node classification result according to the node feature. By means of this method, for a large-scale graph, each iterative calculation involves some of the nodes in the graph and does not require traversing each node in the graph, thereby greatly reducing computational overheads and saving computing resources.

Figure 11:
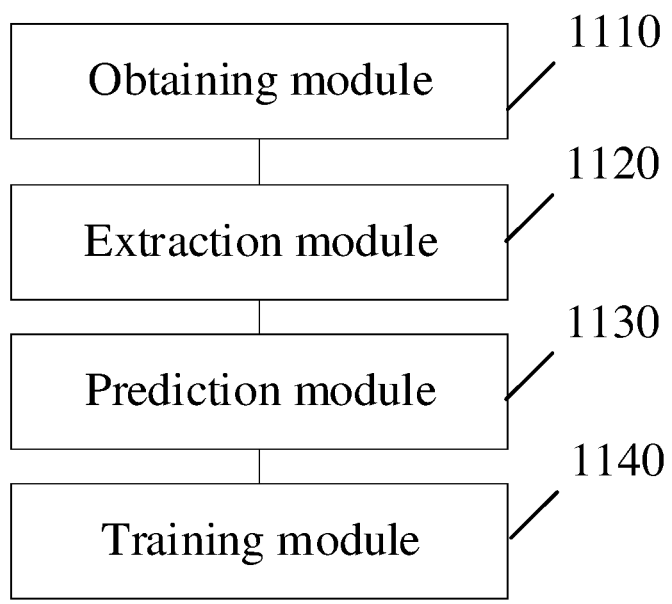
FIG. 11 is a structural block diagram of a model training apparatus according to an exemplary embodiment of this application.

FIG. 11 is a structural block diagram of a model training apparatus according to an exemplary embodiment of this application. Using an example in which the apparatus is applicable to a computer device, as shown in FIG. 11, the apparatus includes an obtaining module 1110, an extraction module 1120, a prediction module 1130, and a training module 1140.

The obtaining module 1110 is configured to obtain a target node subset and a neighbor node subset corresponding to the target node subset from a sample node set labeled with a target node class, a neighbor node in the neighbor node subset being associated with a target node in the target node subset. An association relationship exists between a neighbor node in the neighbor node subset and a target node in the target node subset. In one implementation, each neighbor node in the neighbor node subset may be associated with at least one target node in the target node subset.

The extraction module 1120 is configured to extract a feature subset of the target node subset based on the neighbor node subset by using a node classification model, the feature subset including a feature vector of the target node.

The prediction module 1130 is configured to perform class prediction for the target node according to the feature subset, to obtain a predicted class probability subset.

The training module 1140 is configured to train a target model parameter of the node classification model according to the predicted class probability subset and the target node class of the target node.

In an optional embodiment, the obtaining module 1110 is further configured to obtain the target node subset from the sample node set; calculate a second candidate probability of at least one to-be-selected neighbor node in the sample node set according to the target node subset; and determine the neighbor node subset according to the second candidate probability of the at least one to-be-selected neighbor node.

In an optional embodiment, the obtaining module 1110 is further configured to determine the second candidate probability of a $u^{th}$ to-be-selected neighbor node according to an edge weight between the target node in the target node subset and the $u^{th}$ to-be-selected neighbor node and an edge weight between the target node and a node in the sample node set, u being a positive integer.

In an optional embodiment, the extraction module 1120 is further configured to determine the target model parameter of the node classification model, the target model parameter being a to-be-trained model parameter; and extract the feature subset of the target node subset according to the target model parameter and the neighbor node subset.

In an optional embodiment, the extraction module 1120 is further configured to determine a node feature of an $i^{th}$ target node according to an edge weight between the $i^{th}$ target node and the neighbor node, a feature vector of the neighbor node, and the target model parameter, i being a positive integer.

In an optional embodiment, the training module 1140 is further configured to determine a target loss value according to the predicted class probability subset and the target node class of the target node; determine a model parameter gradient according to the target loss value; and train the target model parameter according to the model parameter gradient.

In an optional embodiment, the training module 1140 is further configured to use a product of the model parameter gradient and a preset learning rate as an adjustment difference of the target model parameter; and adjust the target model parameter by using the adjustment difference.

In conclusion, when updating features of nodes in a process of node classification, the model training apparatus provided in this embodiment selects a to-be-classified node from a target node set, and determines a node feature of the to-be-classified node according to a neighbor node set of the to-be-classified node, to obtain a node classification result according to the node feature. By means of this method, for a large-scale graph, each iterative calculation involves some of the nodes in the graph and does not require traversing each node in the graph, thereby greatly reducing computational overheads and saving computing resources.

Figure 12:
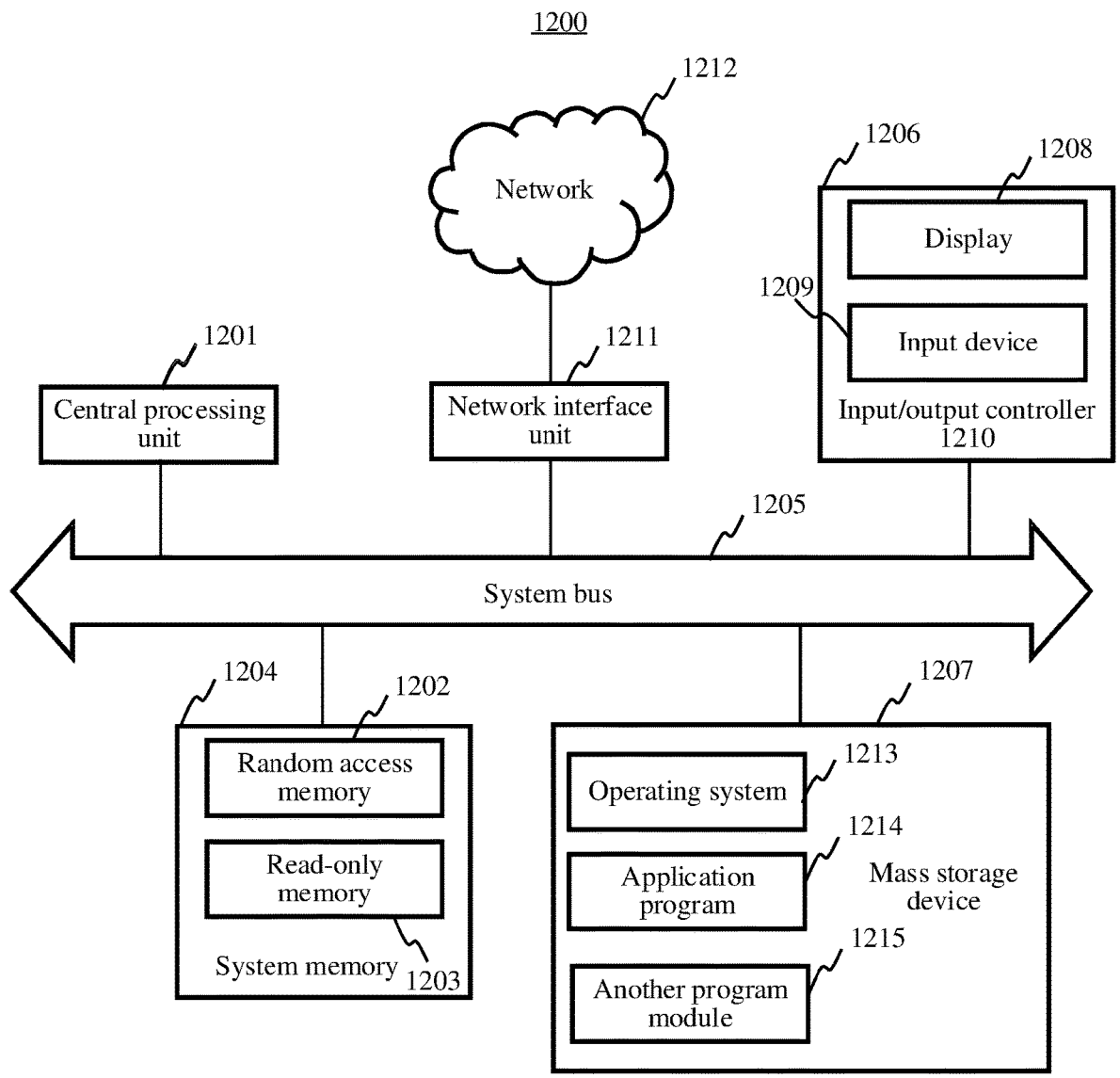
FIG. 12 is a schematic structural diagram of a server according to an embodiment of this application.

FIG. 12 is a schematic structural diagram of a server according to an exemplary embodiment of this application. The server may be the server 310 shown in FIG. 3, where specifically:

A server 1200 includes a central processing unit (CPU) 1201, a random access memory (RAM) 1202, a system memory 1204 of a read only memory (ROM) 1203, and a system bus 1205 connecting the system memory 1204 to the CPU 1201. The server 1200 further includes a basic input/output (I/O) system 1206 assisting in transmitting information between devices in a computer, and a mass storage device 1207 configured to store an operating system 1213, an application program 1214 and another program module 1215.

The basic I/O system 1206 includes a display 1208 configured to display information and an input device 1209 such as a mouse or a keyboard configured to input information by a user. The display 1208 and the input device 1209 are both connected to the CPU 1201 by using an input/output controller 1210 that is connected to the system bus 1205. The basic I/O system 1206 may further include the input/output controller 1210 configured to receive and process input from a plurality of other devices such as a keyboard, a mouse, or an electronic stylus. Similarly, the input/output controller 1210 further provides an output to a display screen, a printer, or another type of output device.

The mass storage device 1207 is connected to the CPU 1201 by using a mass storage controller (not shown) connected to the system bus 1205. The mass storage device 1207 and a computer-readable medium associated with the mass storage device 1207 provide non-volatile storage for the server 1200. That is, the mass storage device 1207 may include a computer-readable medium (not shown) such as a hard disk or a compact disc read only memory (CD-ROM) drive.

Generally, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a magnetic cassette, a magnetic tape, a magnetic disk memory, or another magnetic storage device. Certainly, a person skilled in the art may know that the computer storage medium is not limited to the foregoing types. The system memory 1204 and the mass storage device 1207 may be collectively referred to as a memory.

According to various embodiments of this application, the server 1200 may further be connected, by using a network such as the Internet, to a remote computer on the network and run. That is, the server 1200 may be connected to a network 1212 by using a network interface unit 1211 that is connected to the system bus 1205, or may be connected to a network of another type or a remote computer system (not shown) by using the network interface unit 1211.

The memory further includes one or more programs, which are stored in the memory and are configured to be executed by the CPU.

An embodiment of this application further provides a computer device including a processor and a memory, the memory storing at least one instruction, at least one segment of program, a code set or an instruction set, the at least one instruction, the at least one segment of program, the code set or the instruction set being loaded and executed by the processor to implement the node classification method or the model training method provided in the foregoing method embodiments.

An embodiment of this application further provides a computer-readable storage medium storing at least one instruction, at least one segment of program, a code set or an instruction set, the at least one instruction, the at least one segment of program, the code set or the instruction set being loaded and executed by the processor to implement the node classification method or the model training method provided in the foregoing method embodiments.

It is to be understood that "plurality of" mentioned in the specification means two or more. "And/or" describes an association relationship for associated objects and represents that three relationships may exist. For example, A and/or B may represent the following three cases: only A exists, both A and B exist, and only B exists. The character "/" in this specification generally indicates an "or" relationship between the associated objects.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for training a node classification model, the method comprising:

obtaining, by a device comprising a memory storing instructions and a processor in communication with the memory, a target node subset and a neighbor node subset corresponding to the target node subset from a sample node set labeled with a target node class, a neighbor node in the neighbor node subset being associated with a target node in the target node subset;

extracting, by the device, a feature subset of the target node subset based on the neighbor node subset by using a node classification model, the feature subset comprising a feature vector of the target node;

performing, by the device, class prediction for the target node subset according to the feature subset, to obtain a predicted class probability subset; and training, by the device, the node classification model with a target model parameter according to the predicted class probability subset and a target node class subset of the target node subset, by:

determining, by the device, a target loss value according to the predicted class probability subset and the target node class subset of the target node subset;

determining, by the device, a model parameter gradient according to the target loss value; and training, by the device, the node classification model with the target model parameter according to the model parameter gradient.

2. The method according to claim 1, wherein the obtaining the target node subset and the neighbor node subset corresponding to the target node subset from the sample node set labeled with the target node class comprises:

obtaining, by the device, the target node subset from the sample node set;

calculating, by the device, a candidate probability of at least one to-be-selected neighbor node in the sample node set according to the target node subset; and determining, by the device, the neighbor node subset according to the candidate probability of the at least one to-be-selected neighbor node.

3. The method according to claim 2, wherein the calculating the candidate probability of the at least one to-be-selected neighbor node in the sample node set according to the target node subset comprises:

determining, by the device, the candidate probability of a $u^{th}$ to-be-selected neighbor node according to an edge weight between the target node in the target node subset and the $u^{th}$ to-be-selected neighbor node and an edge weight between the target node and a node in the sample node set, u being a positive integer.

4. The method according to claim 1, wherein the extracting the feature subset of the target node subset based on the neighbor node subset by using the node classification model comprises:

determining, by the device, the target model parameter of the node classification model, the target model parameter being a to-be-trained model parameter; and extracting, by the device, the feature subset of the target node subset according to the target model parameter and the neighbor node subset.

5. The method according to claim 4, wherein the extracting the feature subset of the target node subset according to the target model parameter and the neighbor node subset comprises:

determining, by the device, a node feature of an $i^{th}$ target node according to an edge weight between the $i^{th}$ target node and the neighbor node, a feature vector of the neighbor node, and the target model parameter, i being a positive integer.

6. The method according to claim 1, wherein the training the node classification model with the target model parameter according to the model parameter gradient comprises:

using, by the device, a product of the model parameter gradient and a preset learning rate as an adjustment difference of the target model parameter; and adjusting, by the device, the target model parameter by using the adjustment difference.

7. An apparatus for training a node classification model, the apparatus comprising:

a memory storing instructions; and a processor in communication with the memory, wherein, when the processor executes the instructions, the processor is configured to cause the apparatus to:

obtain a target node subset and a neighbor node subset corresponding to the target node subset from a sample node set labeled with a target node class, a neighbor node in the neighbor node subset being associated with a target node in the target node subset, extract a feature subset of the target node subset based on the neighbor node subset by using a node classification model, the feature subset comprising a feature vector of the target node, perform class prediction for the target node subset according to the feature subset, to obtain a predicted class probability subset, and train the node classification model with a target model parameter according to the predicted class probability subset and a target node class subset of the target node subset, by:

determining a target loss value according to the predicted class probability subset and the target node class subset of the target node subset;

determining a model parameter gradient according to the target loss value; and training the node classification model with the target model parameter according to the model parameter gradient.

8. The apparatus according to claim 7, wherein, when the processor is configured to cause the apparatus to obtain the target node subset and the neighbor node subset corresponding to the target node subset from the sample node set labeled with the target node class, the processor is configured to cause the apparatus to:

obtain the target node subset from the sample node set;

calculate a candidate probability of at least one to-be-selected neighbor node in the sample node set according to the target node subset; and determine the neighbor node subset according to the candidate probability of the at least one to-be-selected neighbor node.

9. The apparatus according to claim 8, wherein, when the processor is configured to cause the apparatus to calculate the candidate probability of the at least one to-be-selected neighbor node in the sample node set according to the target node subset, the processor is configured to cause the apparatus to:

determine the candidate probability of a $u^{th}$ to-be-selected neighbor node according to an edge weight between the target node in the target node subset and the $u^{th}$ to-be-selected neighbor node and an edge weight between the target node and a node in the sample node set, u being a positive integer.

10. The apparatus according to claim 7, wherein, when the processor is configured to cause the apparatus to extract the feature subset of the target node subset based on the neighbor node subset by using the node classification model, the processor is configured to cause the apparatus to:

determine the target model parameter of the node classification model, the target model parameter being a to-be-trained model parameter; and extract the feature subset of the target node subset according to the target model parameter and the neighbor node subset.

11. The apparatus according to claim 10, wherein, when the processor is configured to cause the apparatus to extract the feature subset of the target node subset according to the target model parameter and the neighbor node subset, the processor is configured to cause the apparatus to:

determine a node feature of an $i^{th}$ target node according to an edge weight between the $i^{th}$ target node and the neighbor node, a feature vector of the neighbor node, and the target model parameter, i being a positive integer.

12. The apparatus according to claim 7, wherein, when the processor is configured to cause the apparatus to train the node classification model with the target model parameter according to the model parameter gradient, the processor is configured to cause the apparatus to:

use a product of the model parameter gradient and a preset learning rate as an adjustment difference of the target model parameter; and adjust the target model parameter by using the adjustment difference.

13. A non-transitory computer-readable storage medium, storing computer readable instructions, wherein, the computer readable instructions, when executed by a processor, are configured to cause the processor to perform:

obtaining a target node subset and a neighbor node subset corresponding to the target node subset from a sample node set labeled with a target node class, a neighbor node in the neighbor node subset being associated with a target node in the target node subset;

extracting a feature subset of the target node subset based on the neighbor node subset by using a node classification model, the feature subset comprising a feature vector of the target node;

performing class prediction for the target node subset according to the feature subset, to obtain a predicted class probability subset; and training the node classification model with a target model parameter according to the predicted class probability subset and a target node class subset of the target node subset, by:
- determining a target loss value according to the predicted class probability subset and the target node class subset of the target node subset;
- determining a model parameter gradient according to the target loss value; and
- training the node classification model with the target model parameter according to the model parameter gradient.

14. The non-transitory computer readable storage medium according to claim 13, wherein, when the computer readable instructions are configured to cause the processor to perform obtaining the target node subset and the neighbor node subset corresponding to the target node subset from the sample node set labeled with the target node class, the computer readable instructions are configured to cause the processor to perform:
- obtaining the target node subset from the sample node set;
- calculating a candidate probability of at least one to-be-selected neighbor node in the sample node set according to the target node subset; and
- determining the neighbor node subset according to the candidate probability of the at least one to-be-selected neighbor node.

15. The non-transitory computer readable storage medium according to claim 14, wherein, when the computer readable instructions are configured to cause the processor to perform calculating the candidate probability of the at least one to-be-selected neighbor node in the sample node set according to the target node subset, the computer readable instructions are configured to cause the processor to perform:
- determining the candidate probability of a $u^{th}$ to-be-selected neighbor node according to an edge weight between the target node in the target node subset and the $u^{th}$ to-be-selected neighbor node and an edge weight between the target node and a node in the sample node set, u being a positive integer.

16. The non-transitory computer readable storage medium according to claim 13, wherein, when the computer readable instructions are configured to cause the processor to perform extracting the feature subset of the target node subset based on the neighbor node subset by using the node classification model, the computer readable instructions are configured to cause the processor to perform:
- determining the target model parameter of the node classification model, the target model parameter being a to-be-trained model parameter; and
- extracting the feature subset of the target node subset according to the target model parameter and the neighbor node subset.

17. The non-transitory computer readable storage medium according to claim 16, wherein, when the computer readable instructions are configured to cause the processor to perform extracting the feature subset of the target node subset according to the target model parameter and the neighbor node subset, the computer readable instructions are configured to cause the processor to perform:
- determining a node feature of an $i^{th}$ target node according to an edge weight between the $i^{th}$ target node and the neighbor node, a feature vector of the neighbor node, and the target model parameter, i being a positive integer.

* * * * *